United States Patent
McGee

[15] 3,694,001
[45] Sept. 26, 1972

[54] CONSTANT MOMENT COIL SPRING - AIR BAG SUSPENSION

[72] Inventor: Donald J. McGee, Troy, Mich.
[73] Assignee: Dura Corporation, Southfield, Mich.
[22] Filed: Aug. 31, 1970
[21] Appl. No.: 68,387

[52] U.S. Cl. ............................. 280/124 F, 267/15
[51] Int. Cl. ............................................. B60g 11/56
[58] Field of Search ......... 180/24.02; 267/15, 20, 18; 280/124 F

[56] References Cited

UNITED STATES PATENTS 3,276,476   10/1966   Jackson ................... 267/15 R Primary Examiner—Philip Goodman
Attorney—Hill et al.

[57] ABSTRACT

This invention relates generally to a suspension for motor vehicles. The axle to which the suspension is attached can be raised or lowered by deflating or inflating respectively an air bag between an axle and the frame of the vehicle. A beam fixed to the axle pivots on a bracket attached to the frame. A coil spring, resisting extension thereof, has the ends thereof fixed to the frame and the beam near the axle. The coil spring is arranged with the combination of elements as above set forth in such a manner that the vertical movement of the axle results in a substantially constant moment being exerted by the spring on the beam about its aforementioned pivoting on the bracket.

12 Claims, 3 Drawing Figures

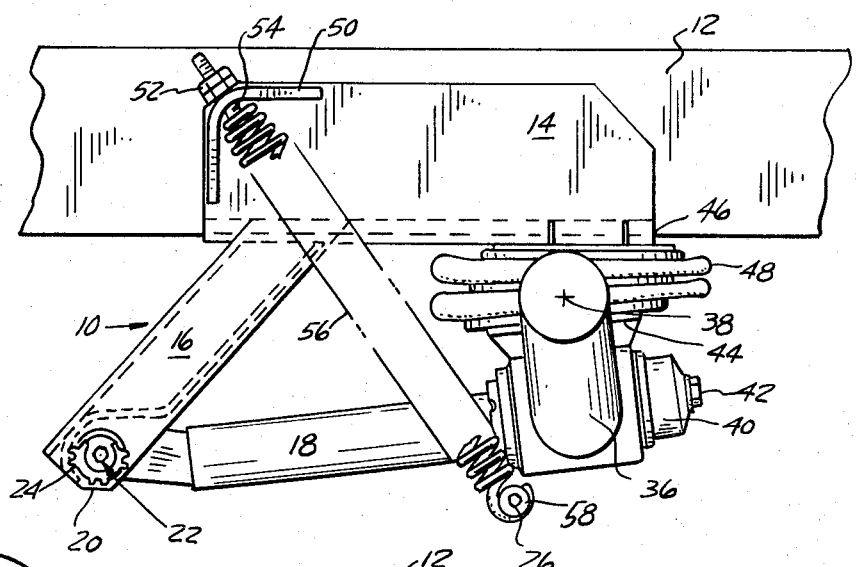
FIG. 1
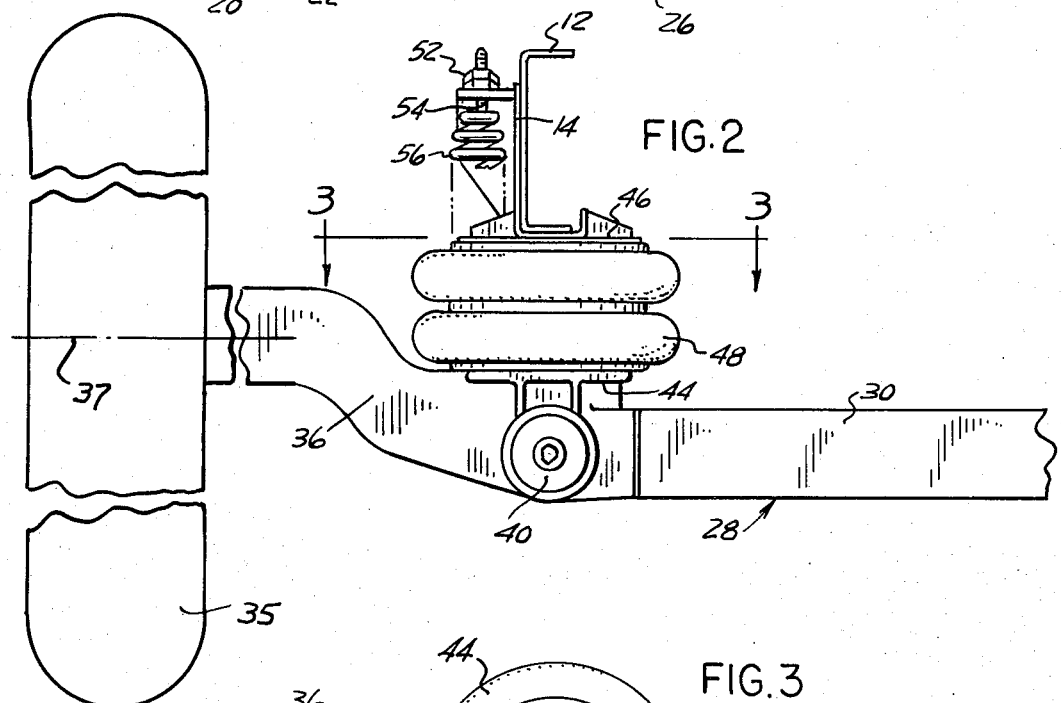
FIG. 2
FIG. 3
INVENTOR
DONALD J. McGEE
BY David A. Maxon
ATTORNEY

CONSTANT MOMENT COIL SPRING - AIR BAG SUSPENSION

This invention relates generally to a suspension for motor vehicles. More particularly, this invention relates to a suspension for trucks or trailers wherein an axle can be selectively raised or lowered responsive to energizing of a pneumatically actuable yieldable member exerting forces between the frame of the vehicle and the axle desired to be raised and lowered. A coil spring is provided to oppose forces on the axle exerted by the energized pneumatically actuable yieldable member. The axle is fixed to a beam rotatable on a bracket member fixed to the frame about an axis parallel to the axle.

In prior art, suspensions have been designed utilizing a combination of a coil spring and an air bag for selectively raising and lowering the axle from the roadway. One difficulty of such prior suspensions has been the variation of the moment exerted by the coil spring on a fixed member to which the axle is attached during the raising and lowering of the axle. This has resulted in problems of design to achieve positively forced raising and positively forced lowering of the axle. This variation of the moment exerted by the coil spring has also resulted in the requirement of larger and heavier air bags having greater strength requirements and requiring greater pneumatic pressures for actuation. It has also resulted in the requirement of heavier coil springs having a higher spring rate and higher strength requirements.

Accordingly, it is an object of this invention to provide a suspension which reduces or eliminates the above difficulties discussed by arranging a combination of a lever arm or beam, coil spring, and air bag with an axle in such a manner as to provide a substantially constant moment exerted on the lever arm to which the axle is attached during the raising and lowering of the axle from the ground.

It is another object of this invention to provide a suspension for a truck or trailer utilizing a combination of pneumatically actuable flexible members and coil springs wherein a substantially constant moment is exerted by the coil springs on the lever to which the axle is attached, the improvements of the invention being readily applicable to prior installed prior suspensions.

It is a still further object of this invention to provide a suspension for a truck or trailer providing a differential of vertical displacement of the major portion of an axle used in the suspension compared to the center of the wheel associated with that axle allowing space beneath the frame of the vehicle for a larger air bag when the axle is raised thereby allowing a greater range of values of parameters determining spring rate and riding characteristics of the suspension.

It is a still further object of this invention to provide a suspension with the improvements described above and which is easy and inexpensive to manufacture, maintain, and install, and which has a relatively uncomplicated design.

Other objects of this invention will appear in the following description and appended claims, referring to the accompanying drawings forming a part of this specification.

ON THE DRAWINGS:

FIG. 1 is a transverse sectional view of preferred embodiment of this invention;

FIG. 2 is a cross-sectional view of the apparatus illustrated in FIG. 1 taken along the sectional lines 2—2 thereof; and FIG. 3 is a cross-sectional view of the apparatus shown in FIG. 2 taken along the sectional lines 3—3 thereof.

Before explaining the present invention in detail, it is to be understood that the invention is not limited in its application the details and construction and arrangement of parts illustrated in the accompanying drawings since the invention is capable of other embodiments and of being practiced or carried out in various ways.

Also, it is to be understood that the phraseology and terminology employed herein is for the purpose of description and not of limitation.

AS SHOWN ON THE DRAWINGS

FIG. 1 shows a preferred embodiment of the invention indicated generally by numeral 10. The suspension 10 is fixed to the frame of the vehicle 12 by means of an L-shaped bracket 14. A bracket arm 16 is fixed to the bracket 14. A beam or lever 18 is journaled near that end 20 of bracket 16 furthest away from the frame. The journaling means 22 comprises a rubber bushing and sprocket member 24. A rod portion 26 having a circular cross-section that is an order of magnitude smaller than the circular cross-section of the beam 18, is fixed to the beam 18.

An axle 28 has a substantially straight right circular cylindrical portion 30 extending directly underneath the truck and an L-shaped portion 36 forming an elbow extending upwardly and outboard of the truck or trailer to which the suspension is attached. The axis of the wheels of the truck are centered about a point 38 on the outboard extremity of the elbow portion 36. The L-shaped portion forming an elbow results in a vertical displacement from the center line 37 of the wheel 35 associated with the axle 28, and the right circular cylindrical portion 30 forming the central portion of the axle 28. This displacement allows for a larger air bag 48. By allowing a larger air bag 48 a wider choice of values of parameters in determining the spring rate of the suspension and the ride characteristics of the suspension can be obtained.

Securing means 40 are provided near the end 42 of beam 18. This securing means 40 comprises bolts and housing members fixing the axle 28 to the beam 18. Brackets 44 and 46, fixed through the securing means 40 and frame 12 respectively, secure an air bag 48 between the frame and the secured fixed junction of the beam 18 and axle 28.

An L-shaped bracket extension member 50 is fixed to the bracket 14 on the frame 12 forward of the axle-beam securing members 40, comprising nuts and washers on a bolt fixed at one end 54 of a coil spring 56 to the frame. The other end of coil 56 is secured by means of a hook portion 58 about the rod member 26 on the beam 18. Rod 26 is positioned on the beam 18 forward of the axle-beam securing means 40 but close thereto, and substantially aft of beam-bracket journaling means 22.

OPERATION

The view of the preferred embodiment of the invention shown on FIG. 1 shows the suspension with the axle in a raised position and a substantially deflated air bag 48. At this point in the operation in the suspension, the coil spring forms an angle of approximately 45° with the beam 18. The tension in the coil spring 56 is directed upwardly and forward of the point 26 and is exerted on beam 18.

Rubber bumpers (not shown) within the air bag provide a counter moment on beam 18 which, together with the moment provided by the weight of the wheels and the axle, resist the moment on the beam 18 exerted by the coil spring 56.

As the air bags are inflated, the beam 18 is forced down. This reduces the stretch on coil spring 56, which causes the tension exerted by coil spring 56 on the beam 18 to decrease. However, as the beam 18 moves downward, the angle between coil spring 56 and beam 18 increases. This results in a greater portion of tension force 56 to be applied in a vertical direction normal to beam 18. The combination of increasing the vertical component of tension force of spring 56 together with the simultaneous decrease in the magnitude of that force, results in a substantially constant moment being applied by the spring 56 on beam 18 about the journaling means 22 on bracket 16.

It can be appreciated from the foregoing description of the operation of the suspension during energization of the air bag that a simultaneous reduction of the tension force of the coil spring is accompanied by an increase of the normal component applied to the beam, resulting in a substantially constant moment being applied throughout the downward movement of the beam 18.

In a similar fashion, when the air bag is de-energized or deflated, the vertical components of the tension force on spring 56 exerted on beam 18 decreases, while the magnitude of that tension force increases. This results in a substantially constant moment exerted by the spring 56 on the beam 18 during the raising of beam 18.

From the foregoing discussion, it can be appreciated that by the practice of this invention, a substantially uniform moment is exerted by a spring on a lever or beam to which the axle is attached throughout the raising and lowering of that axle. Thus, a positive forcing up and a positive forcing down of the axle is achieved with a substantially uniform moment.

I claim:

1. In a suspension for a motor vehicle, the improvements comprising:
   a bracket fixed to the frame of the vehicle;
   a beam journaled at one end to said bracket and operable to rotate about an axis parallel to an axle of the vehicle;
   an axle fixedly attached to said beam at its other end;
   a vertically flexible member interposed between said other end of the beam and the frame of the vehicle;
   a yieldable member attached at one end near said other end of said beam, and attached at its other end to the frame at a substantial forward displacement from said axle;
   wherein the tension in said yieldable member decreases as the axle is lowered, while the vertical component of said tension increases.

2. The apparatus in claim 1 wherein said flexible member is an air bag.

3. The apparatus in claim 1 wherein said yieldable member is a coil springs.

4. The apparatus in claim 1 wherein said yieldable member is in tension.

5. The apparatus in claim 1 wherein said yieldable member urges the axle to rise.

6. The apparatus in claim 1 wherein said flexible member is operable to raise said axle responsive to its energization.

7. The apparatus in claim 1 having means whereby the flexible member is energized responsive to pneumatic pressure being introduced therein.

8. In a suspension for a motor vehicle, the improvements comprising: a bracket fixed to the frame of the vehicle; a beam journaled at one end to said bracket and operable to rotate about an axis parallel to an axle of the vehicle; an axle fixedly attached to said beam at its other end; a vertically flexible member interposed between said other end of the beam and the frame of the vehicle; a yieldable member attached at one end near said other end of said beam, and attached at its other end to the frame at a substantial forward displacement from said axle; wherein the tension in said yieldable member increases as said axle is raised while the vertical component thereof decreases as the axle is raised.

9. In a suspension for a motor vehicle, the improvements comprising: a bracket fixed to the frame of the vehicle; a beam journaled at one end to said bracket and operable to rotate about an axis parallel to an axle of the vehicle; an axle fixedly attached to said beam at its other end; a vertically flexible member interposed between said other end of the beam and the frame of the vehicle; a yieldable member attached at one end near said other end of said beam, and attached at its other end to the frame at a substantial forward displacement from said axle; wherein said yieldable member is so placed with respect to the frame and axle such that the rotation of said beam varies the angle between the line of action of force exerted by said yieldable member on said beam and simultaneously changes the magnitude of such force.

10. In a suspension for a motor vehicle, the improvements comprising: a bracket fixed to the frame of the vehicle; a beam journaled at one end to said bracket and operable to rotate about an axis parallel to an axle of the vehicle; an axle fixedly attached to said beam at its other end; a vertically flexible member interposed between said other end of the beam and the frame of the vehicle; a yieldable member attached at one end near said other end of said beam, and attached at its other end to the frame at a substantial forward displacement from said axle; wherein the geometric arrangement of said yieldable member with respect to said beam is such that the rotation of said beam results in a substantially constant moment applied by said yieldable member on said beam.

11. In a suspension for a motor vehicle, the improvements comprising: a bracket fixed to the frame of the vehicle; a beam journaled at one end to said bracket and operable to rotate about an axis parallel to an axle of the vehicle; an axle fixedly attached to said beam at its other end; a vertically flexible member interposed between said other end of the beam and the frame of the vehicle; a yieldable member attached at one end near said other end of said beam, and attached at its other end to the frame at a substantial forward displacement from said axle; wherein said axle has a central portion having a vertical displacement from the frame;
- said axle having another portion with a central axis that is coincident with a wheel attached thereto having a second vertical displacement from the frame;
- said first mentioned vertical displacement being greater than said second vertical displacement;
- said yieldable member being an air bag;
- the bottom of said air bag being at a third vertical displacement from said frame;
- said third vertical displacement being substantially greater than said second vertical displacement.

12. In a suspension for a motor vehicle, the improvements comprising: a bracket fixed to the frame of the vehicle; a beam journaled at one end to said bracket and operable to rotate about an axis parallel to an axle of the vehicle; an axle fixedly attached to said beam at its other end; a vertically flexible member interposed between said other end of the beam and the frame of the vehicle; a yieldable member attached at one end near said other end of said beam, and attached at its other end to the frame at a substantial forward displacement from said axle; wherein said axle has an elbow shape providing greater space for said yieldable member beneath the frame.

* * * * *